(12) United States Patent
Jones

(10) Patent No.: US 7,656,880 B1
(45) Date of Patent: Feb. 2, 2010

(54) PRIORITIZED SEGMENTATION AND REASSEMBLY METHODS AND SYSTEMS

(75) Inventor: Lawrence Jones, Woburn, MA (US)

(73) Assignee: Verizon Laboratories Inc., Waltham, MA (US)

( * ) Notice: Subject to any disclaimer, the term of this patent is extended or adjusted under 35 U.S.C. 154(b) by 631 days.

(21) Appl. No.: 10/864,616

(22) Filed: Jun. 9, 2004

(51) Int. Cl.
*H04L 12/28* (2006.01)
*H04L 12/56* (2006.01)

(52) U.S. Cl. ............................ 370/395.21; 370/395.42; 370/395.6

(58) Field of Classification Search ................ 370/395.1
See application file for complete search history.

(56) References Cited

U.S. PATENT DOCUMENTS

| | | | | |
|---|---|---|---|---|
| 5,724,352 | A * | 3/1998 | Cloonan et al. | 370/388 |
| 5,751,951 | A * | 5/1998 | Osborne et al. | 709/250 |
| 5,870,474 | A * | 2/1999 | Wasilewski et al. | 380/211 |
| 5,878,041 | A * | 3/1999 | Yamanaka et al. | 370/395.65 |
| 6,169,727 | B1 * | 1/2001 | Song | 370/235 |
| 6,456,631 | B1 * | 9/2002 | Nomura | 370/466 |
| 6,487,217 | B1 | 11/2002 | Baroudi | |
| 6,654,376 | B1 * | 11/2003 | Stacey et al. | 370/395.21 |
| 7,020,141 | B1 * | 3/2006 | Stacey et al. | 370/395.21 |
| 2003/0081613 | A1 * | 5/2003 | Yamanaka | 370/395.21 |
| 2005/0063388 | A1 * | 3/2005 | Stacey et al. | 370/395.1 |

FOREIGN PATENT DOCUMENTS

JP  09023244 A * 1/1997

OTHER PUBLICATIONS

Blake, So, Black, Do, Carlson, M., Davies, Eo Wang, Zo and W. Weiss, "An Architecture for Differentiated AS Services", RFC 2475, Dec. 1998.
TU-T Recommendation 1.366.1, "Segmentation and Reassembly Service Specific Convergence Sublayer for the AAL Type 2", Jun. 1998.
ITU-T Recommendation 1.366.2, "AAL Type 2 Service Specific Convergence Sublayer for Narrowband Services", Nov. 2000.

* cited by examiner

*Primary Examiner*—William Trost, IV
*Assistant Examiner*—Andrew Chriss

(57) ABSTRACT

The disclosed technology provides systems and methods for accommodating a diversity of services (e.g., telephone, video broadcasting, email, etc.) using a fixed connection of a certain service type. A method and system of communicating data using a fixed connection, including, based on at least two service data units (SDUs), associating a priority and a channel identifier with the at least two SDUs, iteratively (i) selecting one of the at least two SDUs based on priority to provide a selected SDU, and, (ii) forming at least one data packet, the at least one data packet including (a) data associated with the selected SDU, and, (b) the channel identifier associated with the selected SDU; and, transmitting the formed at least one data packet using the fixed connection.

16 Claims, 17 Drawing Sheets

PRIORITIZED SEGMENTATION AND REASSEMBLY METHODS AND SYSTEMS

BACKGROUND (1) Field

The disclosed methods and systems relate generally to prioritized network traffic, and more particularly to transmitting prioritized data packets having varying latency requirements over a fixed connection.

(2) Description of Relevant Art

Modern network tasks can be organized into functional layers according to a network standard defined by the International Standards Organization (ISO). In general, each layer is responsible for providing some service to the layer above it, and may use the services of the layers below it. The International Standards Organization defined seven layers as a standard for communication networks and devices. This standard 102 is depicted in FIG. 1. The function of the layers can generally be known as:

(1) A physical layer, which is responsible for transmitting unstructured bits of information across a link;

(2) A data link layer, which transmits structured bits of information across a link;

(3) A network layer, which is responsible for ensuring that a pair of systems in the network can communicate with each other;

(4) A transport layer, which establishes a reliable communications stream between a pair of systems;

(5) A session layer, which offers services above the reliable communication stream provided by the transport layer;

(6) A presentation layer, which is responsible for providing a means by which applications can agree on representations of data; and, (7) An application layer, which runs or executes applications.

Various protocols currently exist to provide the layered functionality of the ISO standard. Two protocols that are widely used for Internet communication are Transmission Control Protocol (TCP) and Internet Protocol (IP), depicted as layer 4 and layer 3 protocols, respectively, in the protocol hierarchy 104 shown in FIG. 1. In TCP/IP, Transmission Control Protocol (TCP) tracks individual units of data provided by the layers above it, while Internet Protocol (IP) delivers the data. As used herein, the term data refers generally to bits (i.e., binary digits) representative of information such as audio, video, text, and/or other types of information that can be represented in binary format.

IP can be understood to be a connection-less protocol in that packet forwarding decisions are decided at intermediate nodes between the source and destination nodes (e.g., on a "per-hop" basis) and, thus, associated packets may not traverse the same path to reach a destination. As such, IP cannot be guaranteed to provide a given delivery and/or bit rate, known as quality of service requirements. Further, although IP has some limited quality of service management capabilities, these capabilities can be subject to unpredictable congestion and/or variable network conditions that affect a connection-less protocol. An option for improving delivery of data, and in particular data having specific quality of service requirements, can be accomplished by employing an integrated services protocol, such as Asynchronous Transfer Mode (ATM), which can provide for the delivery of data over connection-oriented (or fixed) paths that meet diverse quality of service requirements.

An integrated services protocol such as ATM protocol can allocate network resources (e.g., bandwidth) for delivering data according to the guidelines of a number of service categories, such as constant bit rate (CBR) guidelines, available bit rate (ABR) guidelines, non real-time variable bit rate (nrt-VBR) guidelines, real-time variable bit rate (rt-VBR) guidelines, etc. For example, CBR guidelines can provide for allocating resources to satisfy the constant rate, delay-intolerant requirements of services such as live video conferencing, where in contrast, use of nrt-VBR guidelines for such applications may be inadequate.

To transfer data in an ATM network, ATM signaling and/or network management capabilities allocate resources (e.g., bandwidth) to provide what is broadly called a virtual connection, which can generally be understood to be a set of paths established through one or more ATM networks, where a network can include transport (i.e. physical layer) technology such as wireline technology (e.g., copper, coaxial, optical fiber, etc.) and/or wireless technology (e.g., Bluetooth, 802.11B, GSM, etc.). A virtual connection in ATM can be realized as a Virtual Circuit (VC) or a Virtual Path (VP), either of which effectively provides a "connection" for communicating data through an ATM network. An ATM virtual connection enables devices in the network(s) to communicate with each other and is connection-oriented (or fixed) in that communications between devices traverse the same path across the networks, thereby providing a connection that has relatively unvarying transmission conditions compared to a connectionless data path, thereby enabling some degree of quality of service guarantee.

ATM and other existing systems and methods currently are able to provide fixed connections of a single service category for transmitting data suited for the service category, so that data suited for different service categories are generally transmitted over corresponding distinct connections. An example of an ATM-enabled network is illustrated in FIG. 2, wherein fixed connections 208, 210, 212 are provided for communication between a source ATM device 204 and a destination ATM device 206 across a network 202 having a number of nodes 216, 218, 220 (e.g. ATM switches, multiplexers, etc.). The ATM connections 208, 210, 212 are each of a single service category such as, for example, rt-VBR, CBR, and ABR, respectively. In one example, telephone 222, video broadcasting 224, and email 226 services can be in communication with an ATM network access device 204 and can be associated with different service categories. The ATM network access device 204 can allocate distinct connections 208, 210, 212 for carrying data associated with the services 222, 224, 226 and can transmit data associated with each service over the appropriate corresponding connection.

A deficiency of a network exemplified in FIG. 2 is the proliferation of fixed connections and the associated network resources required to provision, maintain and/or manage those connections in network environments having a diversity of services. As shown in the exemplary network of FIG. 2, multiple fixed connections 208, 210, 212 of different service categories may provide for communications between two devices 204, 206. Such systems and methods can quickly diminish network resources in maintaining these connections when the network environment services several different communications devices and data types. Hence, a deficiency of the network illustrated in FIG. 2 relates to the issue of scalability.

The Internet Engineering Task Force (IETF) proposed methods for transmitting data associated with multiple protocols using a single ATM fixed connection, as discussed in IETF proposal RFC1483. However, the proposed methods do not prioritize data associated with different services sharing a single connection and may suffer from a problem known as head of line (HoL) blocking, in which data (of higher priority) that is placed in a queue for transmission after other data (of lower priority) is placed must wait for the earlier-placed data to be completely transmitted before it can be serviced. This problem is of particular concern when, for example, very time-sensitive applications that are distinguished at the IP layer from time-insensitive applications later lose that distinction at the lower-level ATM layer because the applications share a single ATM fixed connection. In this case, the time-sensitive application may experience HoL blocking within the shared ATM connection, particularly when the shared ATM connection is constrained by a low-speed link and the lower priority data packets (associated with the time-insensitive application in this example) are large.

SUMMARY

The disclosed technology provides systems and methods for accommodating a diversity of services (e.g., telephone, video broadcasting, email, etc.) using a fixed connection of a certain service type (e.g., constant bit rate, variable bit rate, etc.). The diversity of data types can be provided by one or more communications devices in the form of service data units (SDUs) and can be associated with one or more requests for data transmission using the fixed connection. As used herein, a service data unit (SDU) refers to a unit of data passed from a particular (higher) layer to a (lower) data link layer of interest (e.g. ATM) for encapsulation, segmentation if necessary, and transmission, or passed from the data link layer to a particular (higher) layer upon reception, re-assembly if necessary, and de-encapsulation.

Systems and methods are provided for receiving two or more SDUs and for iteratively selecting one of the SDUs to provide data for transmission using a fixed connection. The SDUs can be received from one or more software and/or hardware processes operating according to a network layer protocol, such as Internet Protocol. A priority and an identifier can be associated with each SDU, and the SDUs can be iteratively selected based on priority. One or more data packets can be iteratively formed based on the iterative selection of the SDUs, and the formed data packets can be transmitted using the fixed connection, where the data packet(s) can include data associated with a selected SDU, a channel identifier associated with the selected SDU, and/or the priority associated with the selected SDU. In one embodiment, the SDUs can be iteratively selected and packets can be iteratively formed until all SDUs awaiting transmission are entirely transmitted.

In one embodiment, the priority associated with the two or more data packets can be selected from a predetermined set of allowable priority values based on one or more quality of service requirements and/or higher-layer parameters (e.g., above data link layer). In one embodiment, an identifier can be selected from a set of allowable channel identifier values and can be associated with the SDUs based on the priority associated with the SDUs. The channel identifier and/or the priority can be stored in a data packet by coupling control data (i.e. overhead bytes) to data from a selected SDU such that the control data can store one or more values representative of the channel identifier and/or the priority associated with the selected SDU.

In one embodiment, the SDUs can be iteratively selected for transmission amongst those awaiting transmission based on the priority associated with the SDUs and/or on the relative times at which the SDUs were received. The selected SDU can have an associated priority that is greater than or equal to the priorities associated with other non-selected SDUs; effectively implementing a priority based segmentation (when segmentation is performed) and transmission scheme. Segmentation can be performed when the data packets are limited in size such that one or more data packets may be required to transport a single SDU. The iterative selection can continue until the SDUs are fully transmitted.

In one embodiment of the disclosed technology adapted for ATM protocol, a fixed connection can correspond to an ATM virtual circuit, ATM virtual path, a set of ATM virtual circuits, a set of ATM virtual paths, and/or another data link layer virtual circuit (e.g. Frame Relay, PPP, etc.). The iterative selection can utilize a selection procedure provided in an ATM adaptation layer (AAL), which adapts SDUs from upper layer protocols (that rely on the ATM layer service) to ATM cells for transport over an ATM network. An AAL, in general, is comprised of a convergence sublayer (CS) and segmentation and reassembly (SAR) sublayer. The convergence sublayer of an AAL is further sub-divided into two parts: (1) the common part convergence sublayer (CPCS), and (2) the service specific part convergence sublayer (SSCS). The CPCS is generally always used while the SSCS may be unused or "NULL" for some applications. Hence the interactive selection procedure (e.g. based on SDU priority distinctions established at an upper layer) may be implemented within the convergence sublayer (common part or service specific part) and/or segmentation and reassembly sublayer of an AAL. When implemented within an AAL type-2 or AAL type-5 AAL, upon the selection of an SDU for segmentation (amongst those awaiting adaptation and transmission), control data can be coupled to data associated with the selected SDU and that control data may correspond to an ATM cell header, AAL type-2 header or trailer, and/or AAL type-5 header or trailer. In particular, the control data can store a value representative of the channel identifier and/or priority associated with the selected request in the generic flow control field of the ATM cell header (particularly for AAL-5), in the channel identifier field of the AAL type-2 header, and/or in the user-to-user field of the AAL type-5 trailer prior to the segmentation process. The coupled control data and data associated with a selected SDU can be stored in one or more ATM cells for transmission over a fixed connection.

Other objects and advantages will become apparent hereinafter in view of the specification and drawings.

DESCRIPTION

Figure 1:
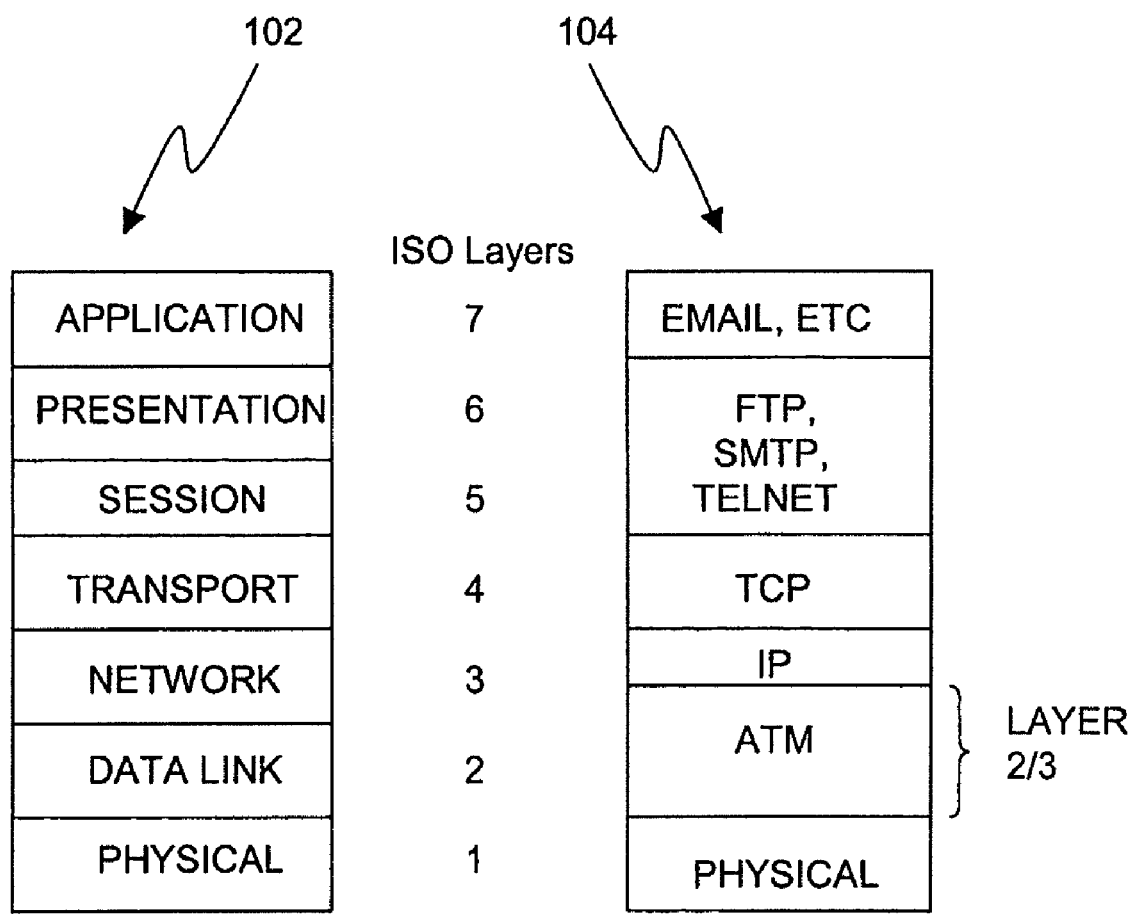
FIG. 1 is a diagram showing a protocol hierarchy in relation to the ISO network standard.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

Communications services such as telephone, video broadcasting, email, and others can be digitized and transmitted over a common network even though they may have very different communication and/or quality of service requirements. These requirements commonly involve communication parameters such as throughput and delay, which describe the rate at which data can be transferred between devices and the duration that the data remains in transit, respectively. Faced with the complex needs of different service types, communications networks are often called upon to manage multiple resources to provide sufficient throughput and delay that meet specific service requirements. For example, the amount of data required for representing high resolution video can be greater than the amount for representing text and, therefore, transmitting video data can require a higher throughput than text data to achieve a similar user perceived quality level.

Another consideration in network management is maintaining an embodiment-specific delay in delivering data as well as an embodiment-specific variation in delay, which can be important in communicating traffic such as real-time video data (e.g., live news broadcast, video-conferencing). In a live video-conferencing session, for example, a long delay in delivering data can cause lag in the voice and/or video communications among participants (an impediment to the user interactivity), while a largely varying delay could cause underflow or overflow in playback buffers in the conferencing application.

Network resources can be allocated to provide communications connection(s) of a particular service type (e.g., CBR, VBR, etc., in ATM) that are tailored to different communications services. For example, network resources can provide a constant bit-rate (CBR) connection based on peak throughput and minimum delay specifications and a variable bit-rate (VBR) channel based on average throughput specifications. Furthermore, network resources can provide substantially "real-time" connection or non-real-time connection based on delay and delay variation specifications. Such quality of service requirements and others can be considered during resource allocation to determine the appropriate connection service type for a communications service. Other requirements that can be considered include, for example, packet loss ratio and packet error rate.

The disclosed systems and methods provide a fixed connection of a certain service type for carrying data associated with communication services. As used herein, an integrated services protocol refers to a protocol that can support a diversity of communication services and/or connection service types by allocating network resources based on quality of service (QoS) requirements. An integrated services protocol can be embodied to perform on an integrated services device, which can include any electronic and/or a processor-based architecture that comprises hardware components and/or software instruction processes. Such integrated services devices can include modems, network interface cards (NIC), service access customer premises equipment (CPE) such as an Integrated Services Access Device (IAD) for Digital Subscriber Loop (DSL), switches, routers, desktop and laptop computers, PDAs, etc.

Referring now to FIG. 1, a network standard 102 defined by the International Standards Organization (ISO) is shown. In one embodiment, an integrated services protocol can provide functionality spanning layer-2 of the ISO model 102, coexisting with another protocol at layer-3 and providing services thereto. As an example, in the protocol hierarchy 104 of FIG. 1, ATM can operate at the data link layer and can also co-exist with IP at the network layer, operating below IP to provide services thereto. In one embodiment, an integrated service protocol can also provide functionality at and/or above layer-3.

Figure 2:
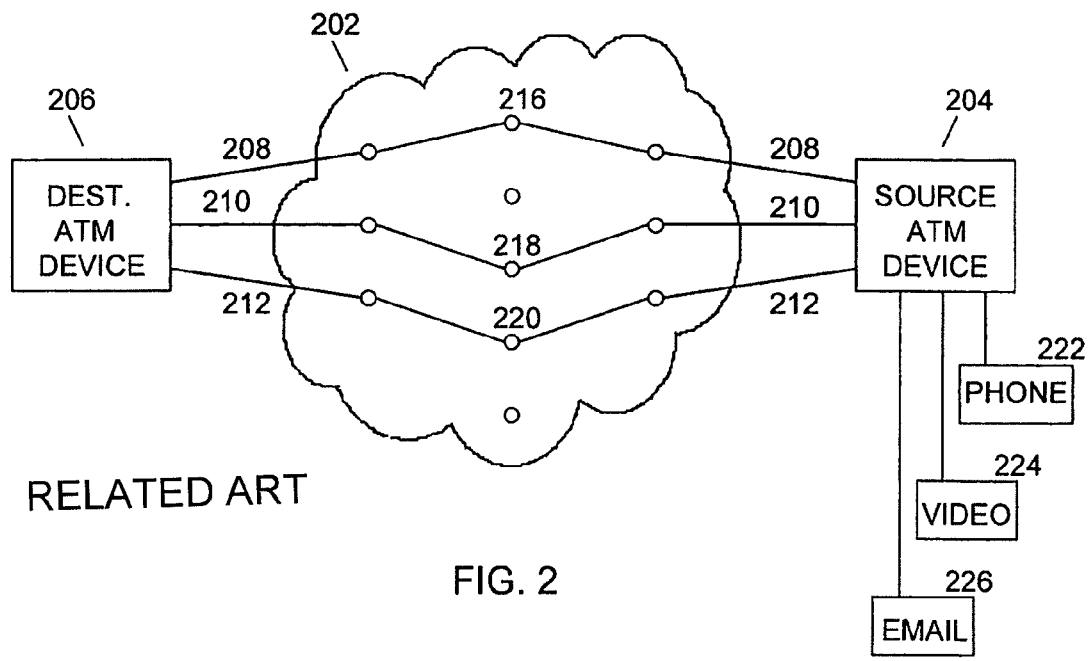
FIG. 2 is a diagram of a network having multiple fixed connections for transmitting data of different service types.

With further reference to FIG. 2, for an ATM-enabled network, the network 202 can include network devices 204, 206 that employ an integrated services protocol, where the illustrated devices 204, 206 can be specifically enabled for ATM. The ATM devices 204, 206 include modems, network interface cards (NIC), service access customer premises equipment (CPE), switches, ATM multiplexers, and/or other network devices. An ATM device commonly allocates multiple fixed connections 208, 210, 212 for carrying data associated with different service types. For example, two ATM devices 204, 206 can communicate by allocating a real-time variable bit rate (rt-VBR) channel 208 for carrying a web-phone conversation, a constant bit rate (CBR) connection 210 for carrying a video broadcasting session 224, and an available bit rate (ABR) connection 212 for carrying an e-mail session 226.

Figure 3:
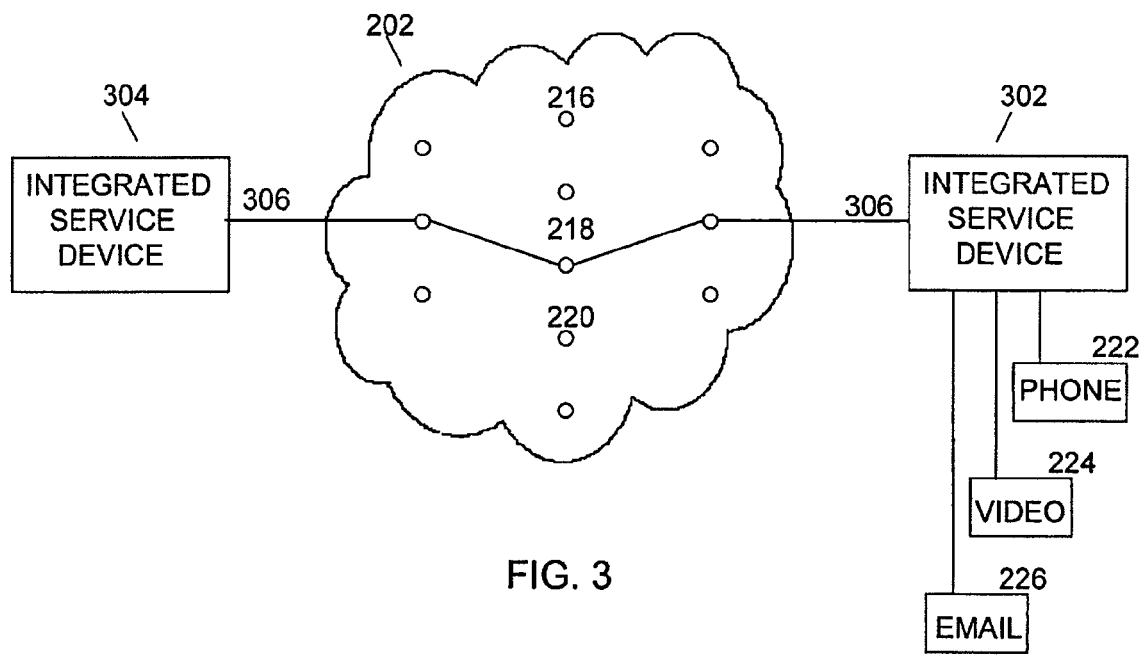
FIG. 3 is a diagram of a network as in FIG. 2, where a single fixed connection can be used for transmitting data from a diversity of service types.

Referring now to FIG. 3, rather than allocating multiple connections in an environment having a diversity of service types, the disclosed systems and methods provide a single fixed connection 306 for carrying data from multiple communications services 222, 224, 226 of different service types. The single fixed connection can be allocated according to a service type appropriate for supporting the most stringent requirements of those services sharing the single connection. Accordingly, a system can include a telephone service 222, a video broadcasting service 224, and an email service 226 in communication with an integrated service device 302. The communications services 222, 224, 226 can provide the integrated services device 302 with requests for data transmission and can also provide SDUs to be transmitted. A communications service can generally operate at an upper layer (e.g., layer 6, layer-7) of the standard network model 102 and can provide a request for data transmission to a lower layer either directly or by utilizing one or more intervening layers, including layers in which other protocols may exist, such as, for example, TCP and/or IP at layer-4 and layer-3, respectively.

Figure 4:
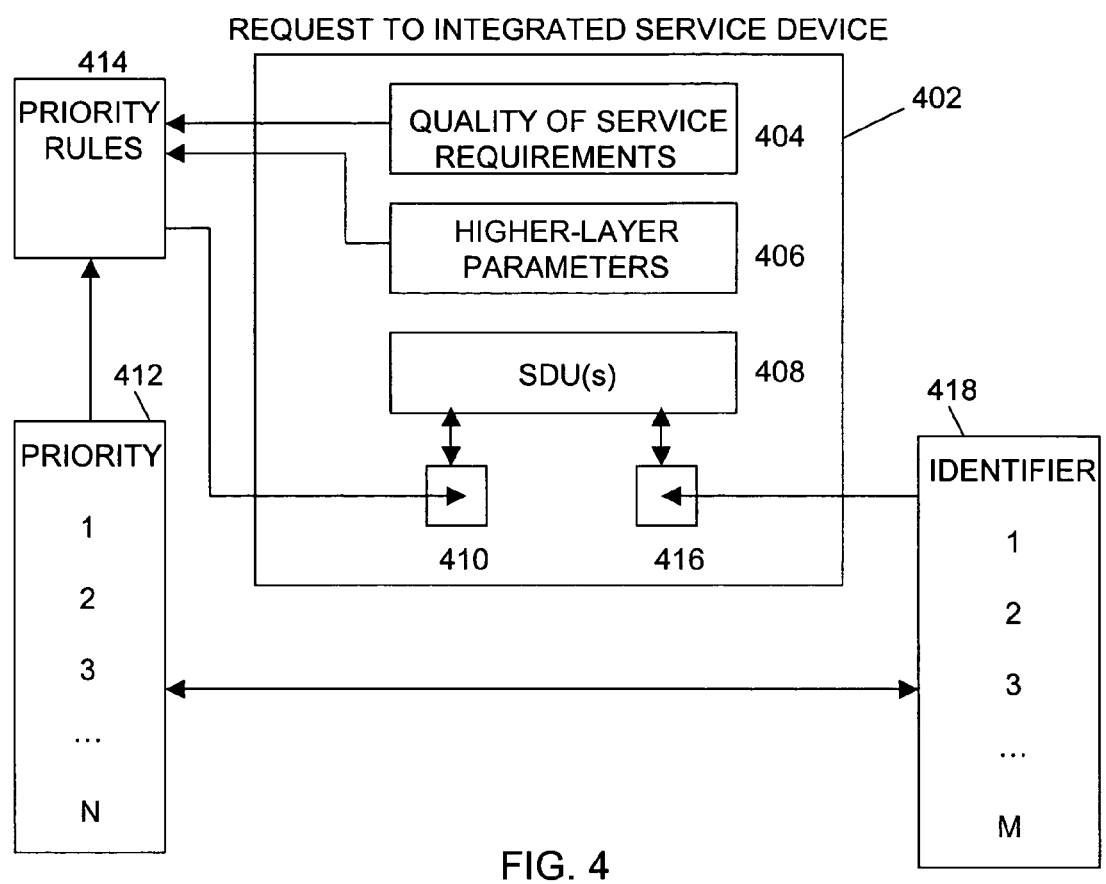
FIG. 4 shows one embodiment of a request for data transmission.

Now referring to FIG. 4, a request for data transmission 402 can include one or more quality of service requirements 404, higher layer parameters 406 (provided by protocols above the integrated service protocol), and/or one or more SDUs 408. As an example, quality of service requirements 404 can include thresholds for packet loss ratio, packet error rate, packet delivery delay, throughput, packet jitter, etc. As used herein, a service data unit (SDU) can be understood to be a unit of data passed from a particular (higher) layer to a (lower) data link layer of interest (e.g. ATM) for encapsulation, segmentation if necessary, and transmission, where the unit of data comprises any collection of consecutive binary digits (bits). The collection of bits of an SDU can be arranged according to an organizational structure with, for example, a particular number of total bits, some of which being reserved for control data and others being reserved for payload data. Alternatively, the bits of an SDU can be unorganized. In one embodiment, an SDU can be accessed in its entirety, or it can be accessed one portion at a time (e.g., when segmentation is performed). As referred to herein, the entirety of an SDU or any portion thereof can be referred to as a block of data of an SDU, which comprises one or more bits.

In one embodiment, a higher layer parameter 406 can be associated with a request for data transmission 402 received from a communications service through intervening network layers. An intervening layer may process the quality of service requirements 404 of a communications service to provide one or more parameters 406 representative of the requirements 404. These parameters 406 can be transferred to the integrated service device, which in one embodiment can interpret and/or recognize such higher layer parameter 406 as being representative of quality of service requirements 404. As an example, a request for data transmission 402 can be received by the Internet Protocol at layer-3. As proposed by the Internet Engineering Task Force in RFC2475, the Internet Protocol contains a 6-bit control data field called the Differentiated Services Codepoint (DSCP), which can represent the QoS requirements 404 using one of sixty-four different values. IP can associate the appropriate DSCP with the request based on the quality of service requirements and transfer the request for data transmission 402 to the lower layer integrated services protocol (e.g. ATM), including the DSCP parameter 406 with the request 402. In this case the IP packets would represent the SDUs transferred to the AAL, where the different DSCP codings could be mapped to distinct channel identifiers.

In one embodiment, an integrated service device receiving a request for transmission 402 can associate a priority 410 with the request 402 and with any SDUs 408 associated with the request based on quality of service requirements 404 and/or higher-layer parameters 406. A priority 410 can be selected from a predetermined set of allowable priority values 412 and can be indicative of transmission order, such that a request associated with a priority higher than those of other co-pending requests can be serviced before such other co-pending requests. As an example, a set of allowable priorities 412 can include integer values ranging from one to N. In one embodiment, a priority value of one can be understood to be higher in priority than a priority value of two or greater. Similarly, a priority value of two can be understood to be higher in priority than a priority value of three or higher, etc. The relationship can continue to other priority values, with a priority value of N being the lowest priority. Priority schemes other than those provided herein can also be used.

In one embodiment, a priority 410 can be associated with a request for data transmission 402 and any SDU(s) 408 thereof according to one or more rules 414 based on quality of service requirements 404. As an example, a particular rule 414 can determine a priority value 410 based on delivery delay requirements such that requests 402 that tolerate a higher delivery delay can be associated with a lower priority value 410. Another rule 414 can associate a priority value 410 based on throughput requirements such that requests 402 that require a higher throughput can be associated with a higher priority value 410. One or more rules 414 can thus be utilized to associate a priority value 410 with one or more SDUs 408 for transmitting the SDUs over a network.

In one embodiment, a priority 410 can alternatively or additionally be associated with a request for data transmission 402 and with any SDU(s) 408 thereof according to one or more rules 414 based on higher layer parameter(s) 406. Referring again to IP Differentiated Service Code Points (DSCP) as an example of a higher layer parameter 406, one or more rules 414 can specify an association between DSCPs 406 and allowable priority values 412. As an example, if the DSCP 406 (e.g., six bits, sixty-four levels) includes more levels of differentiation than the set of allowable priority values 412 (e.g., if number of priority values is less than sixty-four), then the rules 414 may associate multiple DSCP values with a single value in the set of priorities 412. If the DSCP 406 includes fewer levels of differentiation than the set of allowable priority values 412 (e.g., if number of priority values is greater than sixty-four), then the rules 414 may use a subset of the available priority values, or in the case that QoS requirements 404 are also included in the request for data transmission 402, the rules 414 can consider the DSCP 406 together with the QoS requirements 404 to provide further priority distinction among otherwise unused priority values.

A channel identifier 416 can also be associated with a request for data transmission 402 for distinguishing between different requests 402 and SDUs 408. A channel identifier 416 associated with a request 402 can be selected from a predetermined set of allowable channel identifier values 418. In one embodiment, the number of distinct allowable channel identifier values 418 can be an upper bound on the number of multiplexed channels that can be permitted over a single shared connection. In one embodiment, a channel identifier value 416 can be selected from among the set of channel identifiers 418 that are not already associated with another request for data transmission. In one embodiment, a channel identifier value 416 can be selected from the set of channel identifier 418 based on an association between the set of priority values 412 and the set of channel identifiers 418. For example, channel identifier values one and five may be associated with a priority value of one, identifier values two and six may be associated with a priority value of two, etc. Thus, according to the example, a request for data transmission 402 having an associated priority value 410 of one, can be associated with a channel identifier value 416 of one or five. Accordingly, as provided herein, a request 402 can be associated with a priority 410 and a channel identifier 416, where the priority 410 and channel identifier 416 can be associated such that the channel identifier implicitly denotes the priority level.

Figure 5A:
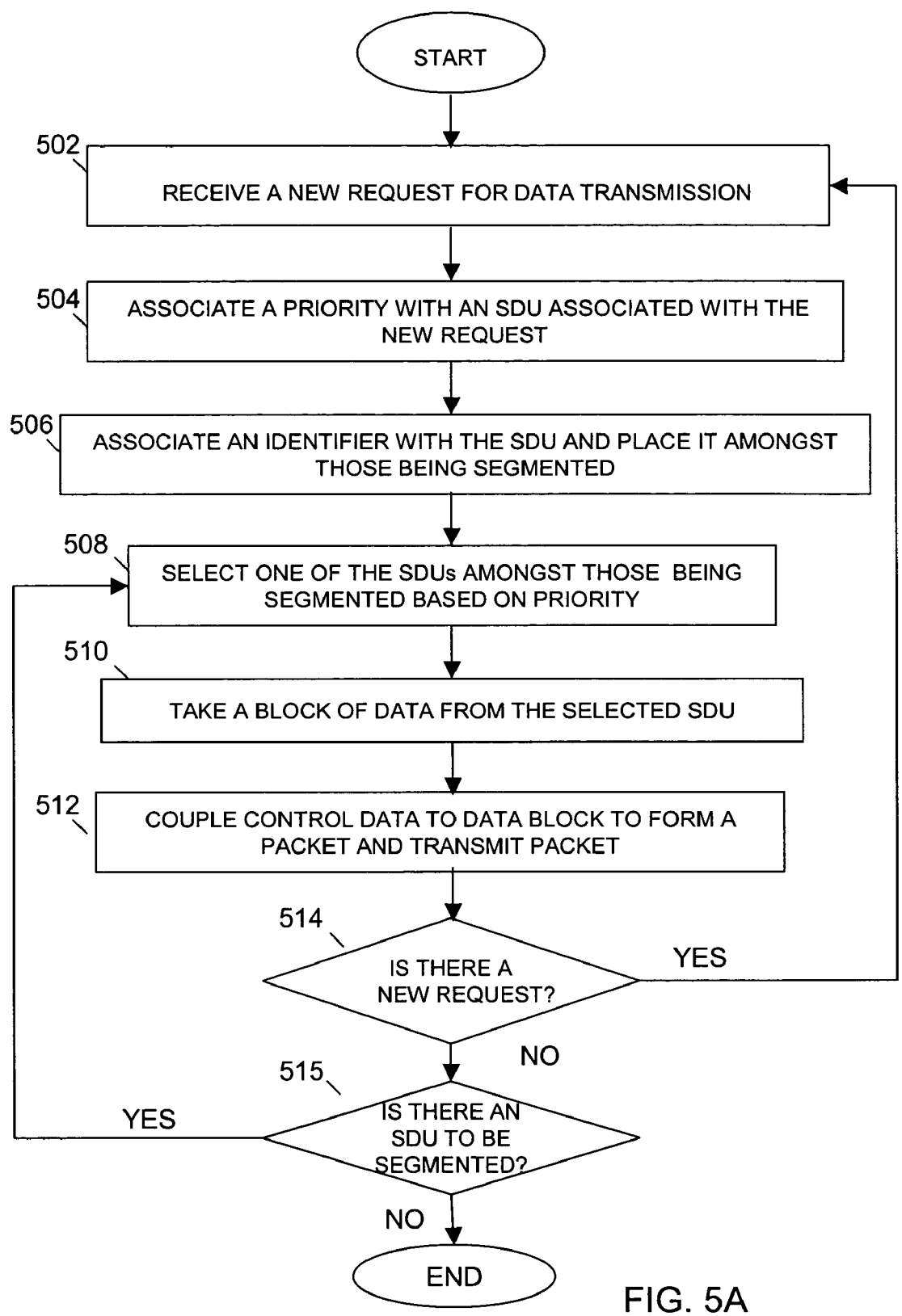
FIGS. 5A-5B illustrate an exemplary method for prioritizing the segmentation process for data to be transmitted using a fixed connection.

Referring now to FIG. 5A, an integrated service device servicing a request for data transmission can receive and service new requests for data transmission (502). A new request for data transmission can include quality of service requirements and/or higher-layer parameters and can be associated with one or more SDUs to be transmitted. An integrated service device can associate a priority with the new request and the SDU(s) based on the quality of service requirements and/or the higher-layer parameters (504). A channel identifier can also be associated with the new request and the SDU(s) based on the priority value associated therewith (506). Based on priority, an integrated service device can select a an SDU associated with a pending request (508) and can retrieve a block of data from the selected SDU (510), where the block of data can be the entire selected SDU or a portion thereof. Control data can be coupled to the data block to form a packet (or cell), and the packet can be transmitted to its destination (512). If there is another new request for data transmission (514), an integrated service device can service a new request. If there is no new request and there are still SDUs to be segmented, the integrated service device can select another SDU based on priority (515).

Figure 5B:
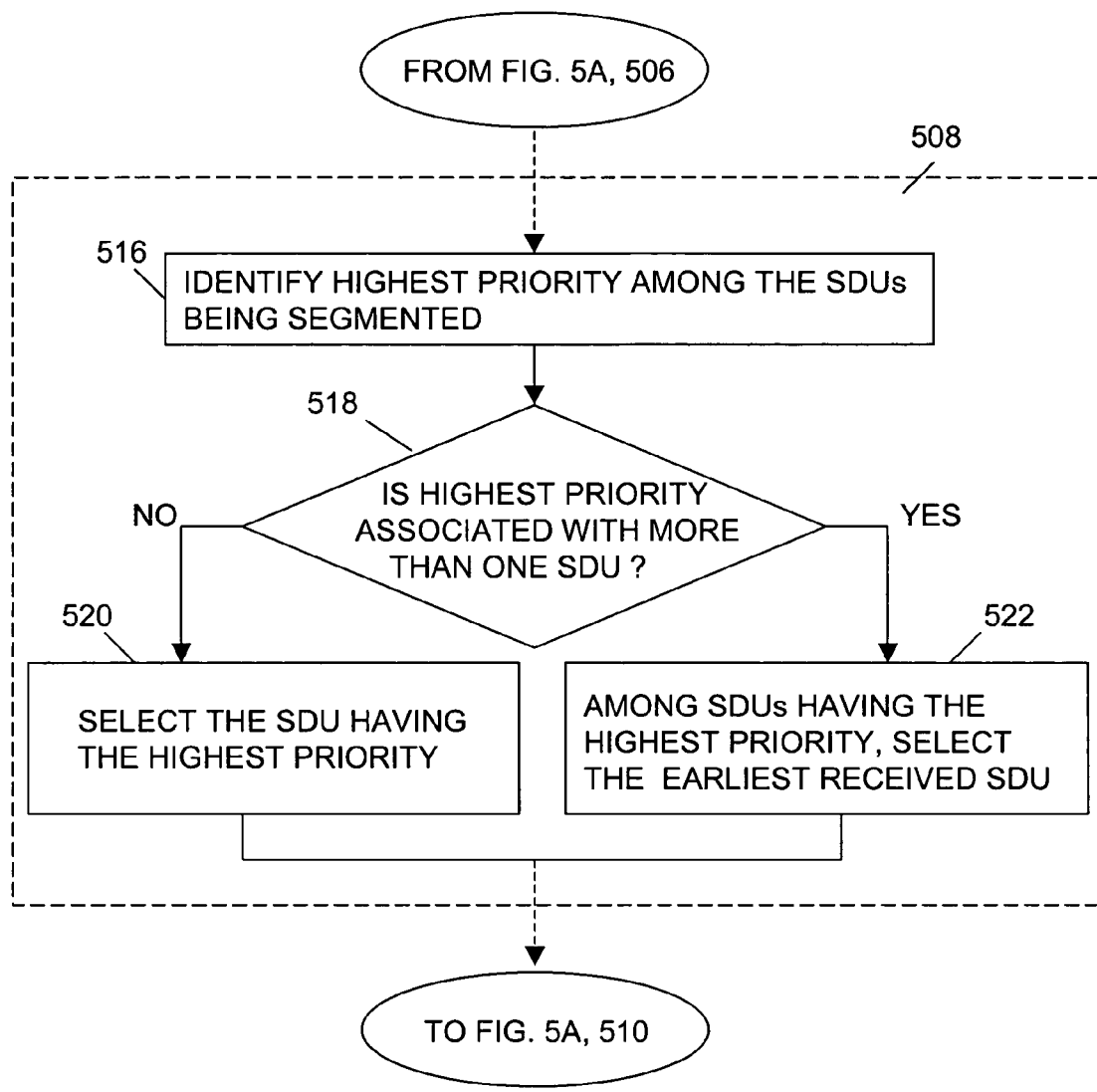

Referring to FIG. 5B, there is shown in further detail an exemplary method for selecting an SDU based on priority. From the SDUs waiting to be transmitted, the selection process can identify the highest priority value associated with the SDUs (516) and the number of SDUs having that priority (518). If the highest priority value is associated with only one SDU, the request can be selected (520). Otherwise, if there are multiple SDUs with the highest priority, the earliest-received SDU can be selected (522).

Accordingly, systems and methods according to the method of FIGS. 5A and 5B can provide a connection for carrying data of multiple service types. Further, selecting SDUs based on priority and transmitting only a portion/block of data from a selected SDU during each iteration also mitigates the head of line blocking inefficiency. Accordingly, because of the segmentation and interleaving realized by the exemplary methods depicted in FIGS. 5A and 5B, a higher priority SDU can be serviced and transmitted without having to wait for a previously arrived lower priority SDU to be completely transmitted.

Figure 6A:
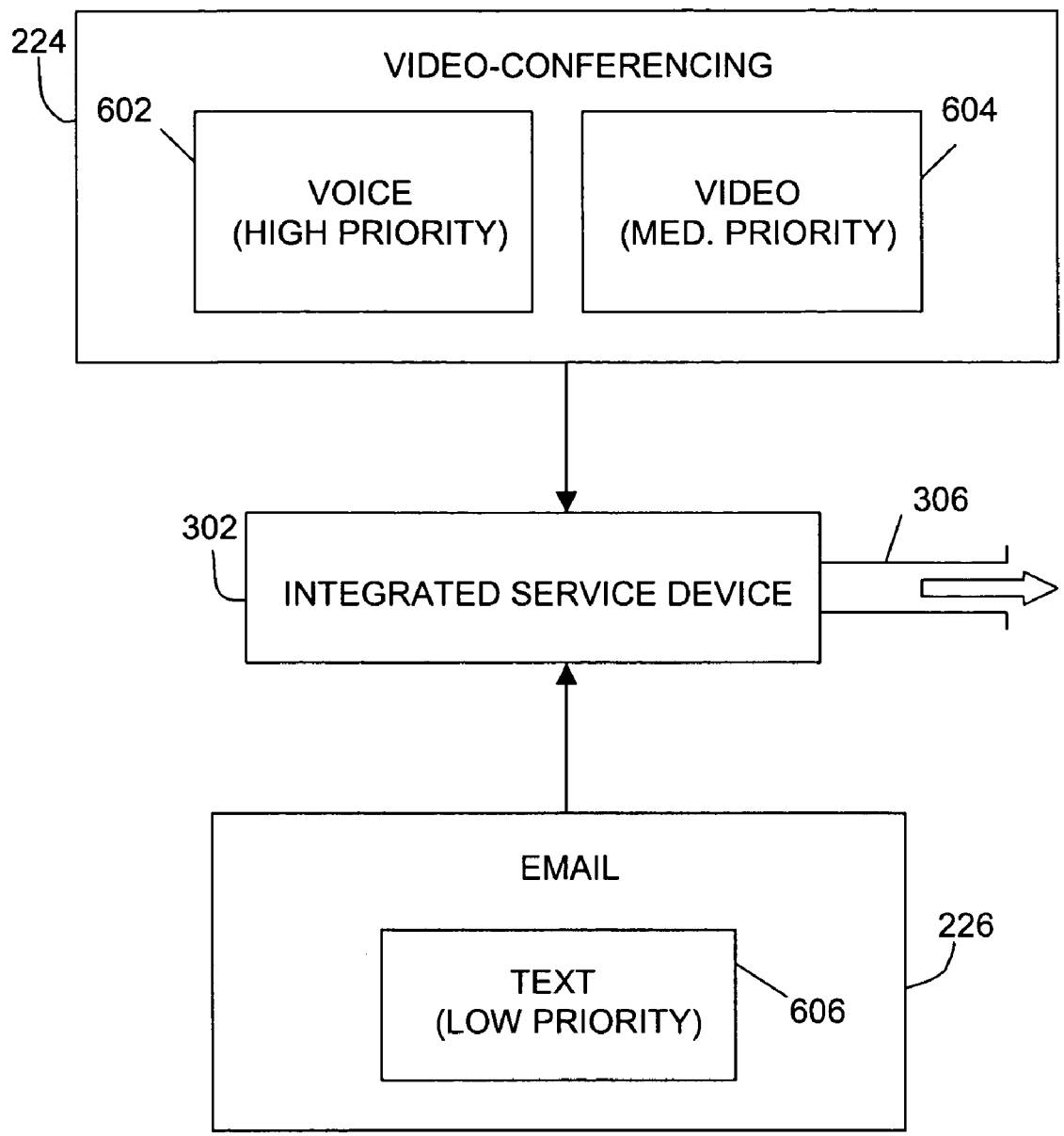
FIGS. 6A-6C illustrate an interaction between various devices and an integrated services access device for transmitting packets using multiplexed/prioritized channels across a fixed connection using a method according to FIGS. 5A-5B.

Referring now to FIG. 6A, an integrated services device 302 can be in communication with multiple communications services 224, 226 that can submit requests for data transmission 602, 604, 606 thereto. In the illustration of FIG. 6A, an integrated services device provides access transport services for a video-conferencing service 224 and an e-mail service 226. During a video-conferencing session, voice and video data can be separately and simultaneously communicated, where the voice and video data can be associated with separate requests for data transmission 602, 604 in which, in one embodiment, the voice transmission request 602 can have a higher priority than the video transmission request 604. An e-mail service 226 in communication with the integrated services device 302 can separately submit a request to transmit text data 606, where the text request can have a lower priority than the voice and video requests 602, 604.

Figure 6B:
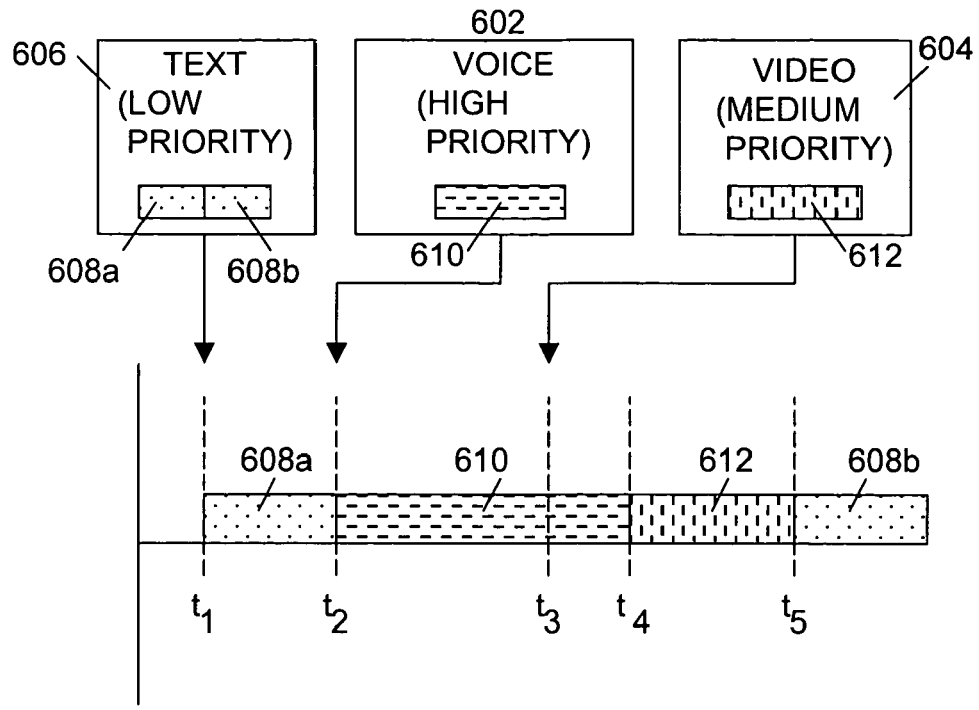

Referring now to FIG. 6B, in the illustrated example, the e-mail service 226 provides a low priority request for data transmission 606 and an SDU 608, shown as 608a and 608b, to the integrated services device 302 at a time $t_1$ when no other requests are being serviced. Between time $t_1$ and a subsequent time $t_2$, blocks of data from that portion of SDU 608 designated 608a are transmitted over the connection 306, in accordance with the request 606. Before the SDU 608 is transmitted in its entirety by the integrated service device 302, the video-conferencing service 224 provides a high priority request for data transmission 602 to the integrated service device 302 at time $t_2$. This request 602 has a higher priority than the low-priority request 606 from the e-mail service 226, and accordingly, the integrated services device 302 can select at time $t_2$ the SDU 610 associated with the high-priority request 602 and can transmit blocks of data from that SDU 610.

Figure 6C:
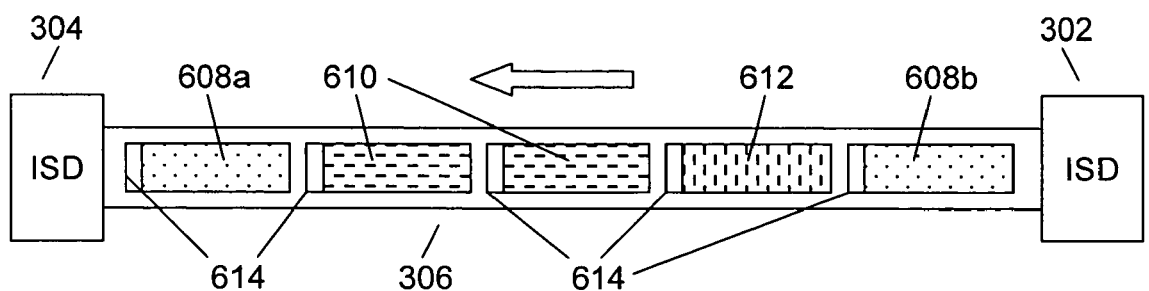

While blocks of data from the SDU associated with the high priority request 602 are transmitted, the video-conferencing service 224 can also provide a medium priority request for data transmission 604 to the integrated services device at some time $t_3$ before the SDU 610 associated with the high priority request 602 has been completely transmitted. In the example, the medium priority request 604 has a lower priority than the high priority request 602. Accordingly, data associated with the high priority request 602 from the video-conferencing service 224 can continue to be transmitted at time $t_3$. Upon completely transmitting the SDU 610 associated with the high priority request 602 at time $t_4$, the integrated services device 302 can select the SDU 612 associated with the medium priority request 604 at time $t_4$. Blocks of data from the SDU 612 associated with the medium priority request 604 can be transmitted until the SDU 612 is completely transmitted, at some time $t_5$. Then, the remaining data from SDU 608, (e.g., those blocks of data associated with 608b) associated with the low priority request 606 from the e-mail service 226 can be transmitted at time $t_5$ (e.g., provided that no higher priority requests are received prior to $t_5$). With further reference to FIG. 6C, there is shown a sequence of packets containing data associated with the SDUs 608, 610, 612 of FIG. 6B and transmitted over a single connection 306. Each packet has a header or control data 614. It is not necessary for intermediate nodes (e.g., FIG. 2, 216, 218, 220) that are part of the fixed connection 306 to be aware of the channel identifier or priority of the data associated with the applications that share the connection since intermediate nodes need only forward the packets in the same order they are received. However, an integrated services device 304 at a receiving end of the network or a node (e.g., a router) that terminates the data link layer and passes data to an upper layer (e.g. the IP layer), can receive the packets and utilize the channel identifier and priority as part of a packet reassembly process.

In one embodiment, network resources can be allocated for one or more fixed connections to accommodate a predetermined combination/quota of service types and/or quality of service requirements. Upon receiving a new request for data transmission, an integrated services device can evaluate the quality of service requirements of the new request to determine which fixed connections and/or channels of varying priority within the available fixed connections are able to accommodate the new request.

In one embodiment, network resources can be dynamically allocated for a fixed connection 306 when new requests for data transmission are received. Network resources can initially be allocated for a fixed connection 306 based on a single request when no other requests are received. When additional requests are received, additional network resources can be dynamically allocated for the fixed connection 306 to accommodate the new requests.

With respect to an exemplary embodiment of the disclosed methods and systems as applied to the ATM protocol, and with reference to the protocol stack 104 of FIG. 1, ATM can operate below IP and provide services thereto. The ATM layer operates at layer-2 to provide virtual point/multi-point to point/multi-point transport to upper layer protocols/applications across a switched ATM network. A packet prepared by the ATM layer is called a cell and has a fixed length comprising five bytes of control data coupled to forty-eight bytes of higher-layer data.

Above the ATM Layer and below layer 3 (i.e. layer 3 representing a network layer protocol such as IP) is the ATM Adaptation Layer (AAL), which provides error detection, identification, segmentation and reassembly, and other capabilities. The AAL is comprised of two sublayers: the convergence sublayer (CS) and the segmentation and reassembly (SAR) sublayer. The convergence sublayer in turn consists of two parts. The convergence sublayer common part (CPCS) and the convergence sublayer service specific part (SSCS). The SSCS resides above the CPCS and provides service specific functions for applications that require them. If an application does not require any service specific functions, the SSCS can be effectively NULL/transparent. In contrast, the CPCS supports more generic functions that are common to almost all applications that utilize a given AAL. The convergence sublayer can couple control data in the form of one or more headers and/or trailers to data received from a higher layer protocol. A common part convergence sublayer can process an entire data segment associated with a request for data transmission or can process multiple block portions of a an SDU. Network standards are defined for AAL-1 through AAL-5 and specify the structure and functionality of the CS and SAR sublayers. Embodiments of an AAL according to the disclosed technology are described below.

Figure 7:
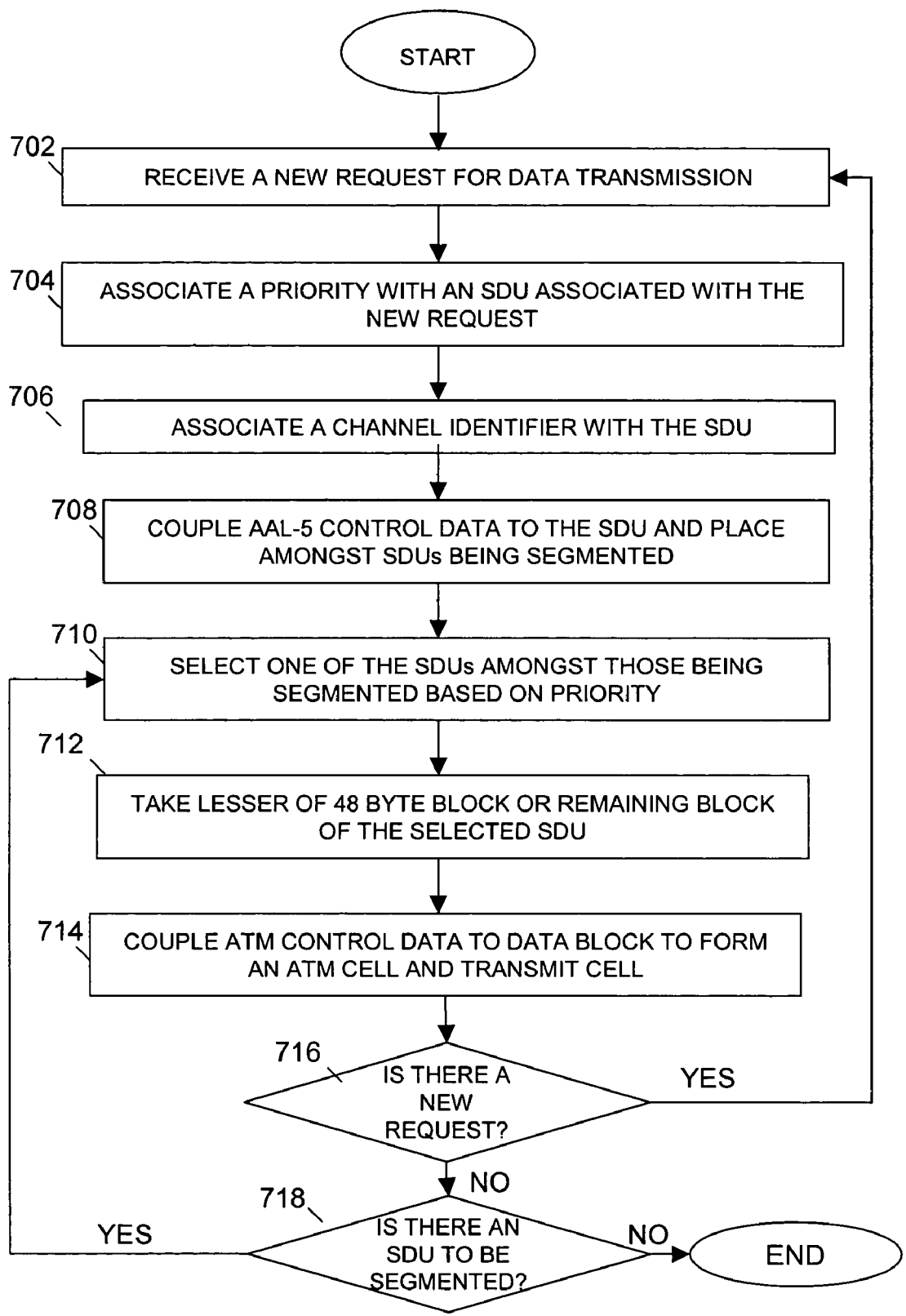
FIG. 7 illustrates and exemplary method of receiving and servicing requests for data transmission adapted to the ATM AAL-5 protocol.

Referring to FIG. 7, there is shown a flow diagram of one embodiment of receiving and servicing requests for data transmission adapted to operate with the AAL-5 standard. A new request for data transmission can be received (702) at ATM adaptation layer-5 and can include one or more quality of service requirements and/or higher layer parameters, and can be associated with one or more SDUs. A priority can be associated (704) with the new request and the SDU(s) based on the quality of service requirements and/or higher-layer parameters, and a channel identifier can be associated (706) with the request and SDU(s) based on priority. AAL-5 control data can be coupled to the SDUs (708) and can contain the priority and/or channel identifier associated with the SDU(s).

Based on priority, one of the SDUs waiting to be transmitted can be selected (710) using a selection process operating in AAL-5. In one embodiment, a 48-byte block of data can be taken from the selected SDU, or if less than 48-bytes of data remain in the selected SDU, the remaining block of data can be coupled with "filler" (or padding) bytes (e.g., value of zero, value of all ones, etc. . . . ) to provide a 48-bytes block of data (712). The 48-byte block can be coupled to an ATM cell header containing ATM control data, and the complete ATM cell can be transmitted over a fixed connection (714). The fixed connection can be an ATM virtual circuit, an ATM virtual path, a set of ATM virtual circuits, and/or a set of ATM virtual paths. If there is another new request for data transmission (716), an integrated service device can service the new request. Otherwise, if no new requests are received and if there are SDUs waiting to be transmitted (718), the integrated service device can again select an SDU based on priority (710), thereby iteratively selecting SDUs for providing data to be transmitted over a fixed connection.

FIGS. 8A-8D provide an illustration of the disclosed systems and methods for receiving and servicing SDUs according to the method of FIG. 7. The IP layer shown in FIG. 38A can provide a first request for data transmission, having SDU 802. The AAL-5 can receive the first request for data transmission and associate a priority and a channel identifier therewith, where the priority and/or channel identifier can be stored in AAL-5 control data 806 coupled to the SDU 802. In one embodiment, the control data 806 can correspond to an AAL-5 convergence sublayer trailer having an 8-bit field called the user-to-user field. The 8-bit user-to-user field can store the priority associated with the request, which can thus have one of two-hundred fifty-six potential priority values.

With no other SDUs waiting to be transmitted, the SDU 802 from the first request can be selected to provide a 48-byte block of data 810, which can be coupled to ATM control data 820 at the ATM Layer. In one embodiment, the ATM control data 820 corresponds to a 5-byte ATM cell header having a 4-bit general flow control (GFC) field. The 4-bit GFC field can store the channel identifier associated with the selected SDU 802, which can thus have one of sixteen potential channel identifier values. The complete 53-byte ATM cell 830 can thus contain an a channel identifier and the data block contained therein can be distinguished from other data blocks transmitted over the fixed connection 828.

Figure 8A:
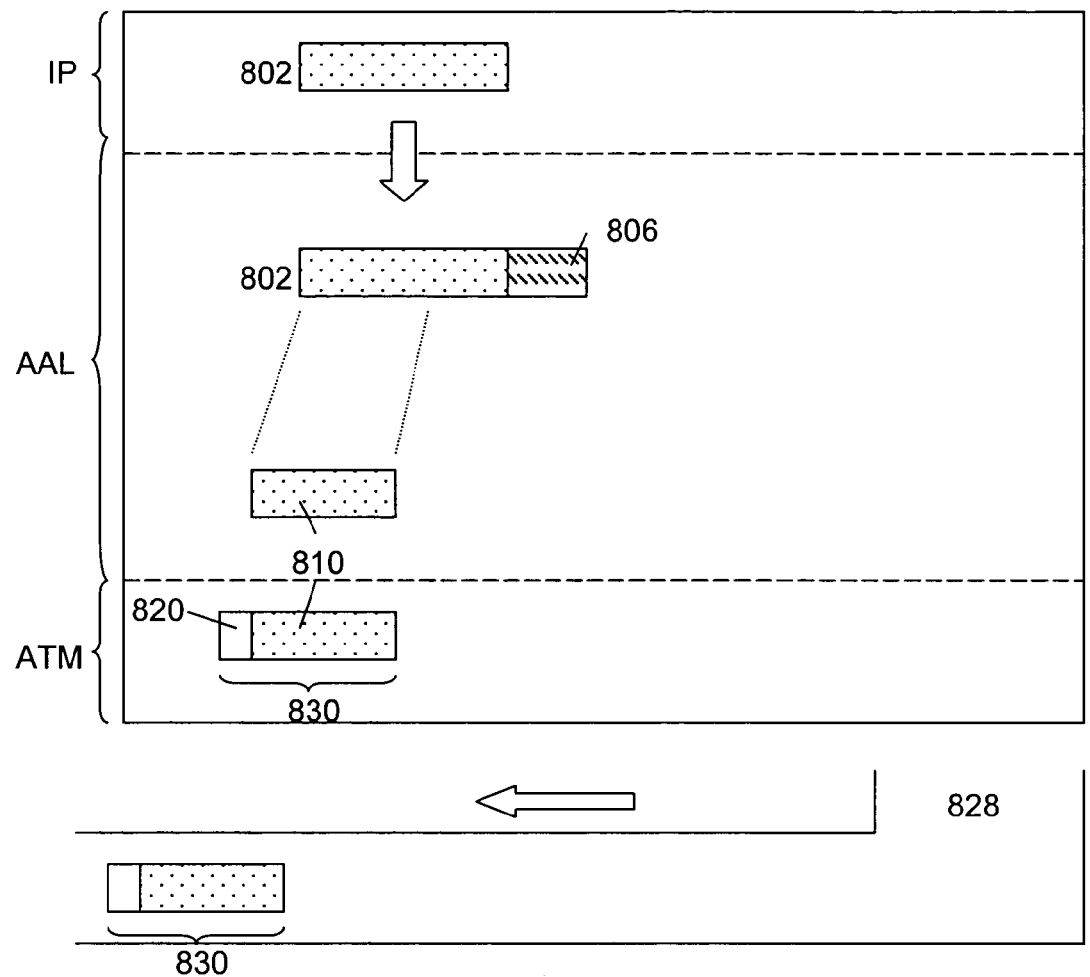
FIGS. 8A-8D are diagrams of preparing data to be transmitted over an ATM network for systems and methods according to FIG. 7.
Figure 8B:
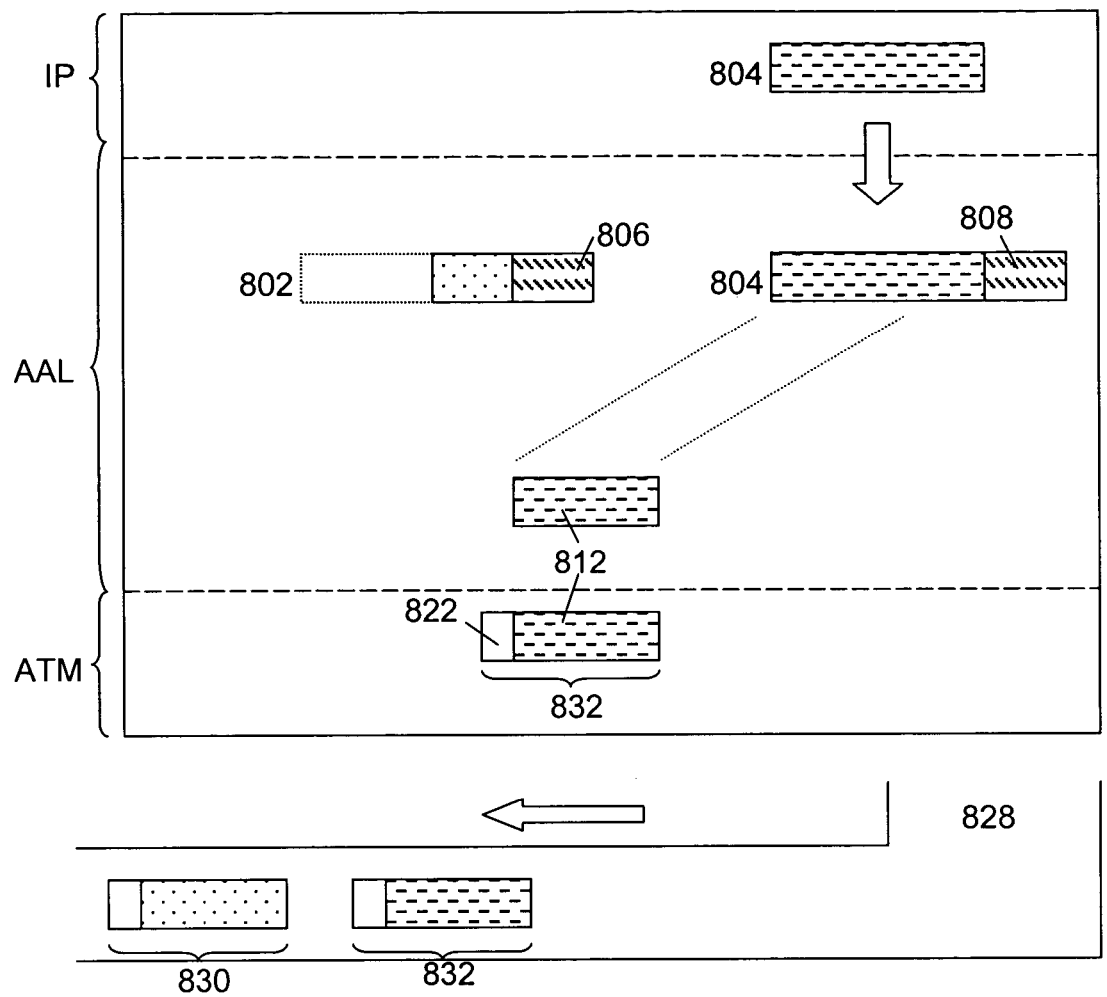

Referring now to FIG. 8B, after transmitting the first ATM cell 830, the IP layer can provide a second request for data transmission, having SDU 804. The AAL-5 can receive the second request for data transmission and associate a priority and an a channel identifier therewith. The SDU 804 associated with the second request for data transmission can be coupled to AAL-5 control data 808, which can store the priority associated with the second request in the 8-bit user-to-user field.

In the illustrated scenario, the priority associated with the second SDU 804 can be higher than the priority associated with the first SDU 802. Accordingly, the second SDU 804 can be selected to provide a 48-byte block 812 of data, which can be coupled to ATM control data 822 at the ATM Layer. The control data 822 can store the channel identifier associated with the second SDU 804 in the 4-bit GFC field, and the complete 53-byte ATM cell 832 can be transmitted over the fixed connection 828.

Figure 8C:
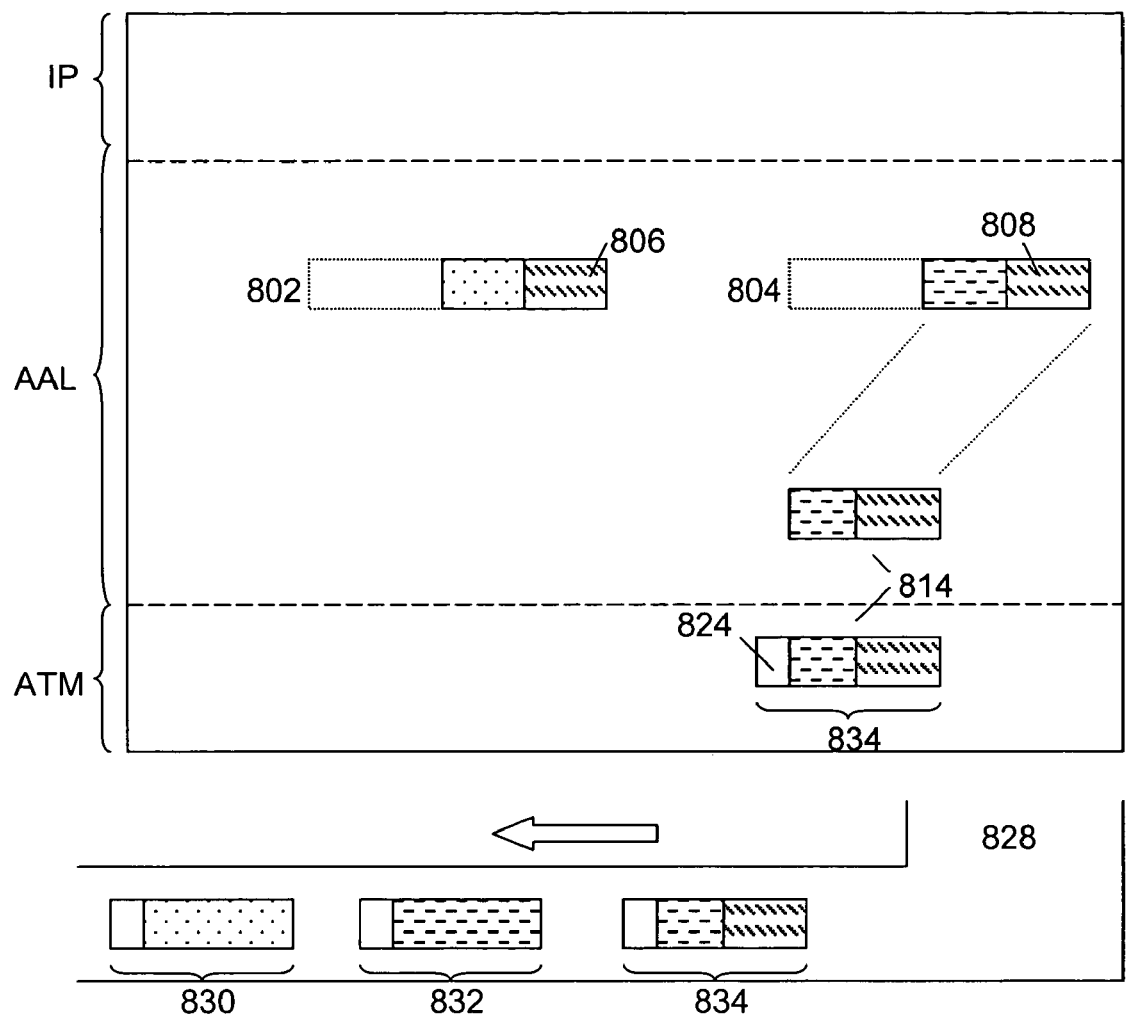

Referring to FIG. 8C, if there is no further new request, one of the (first and second) SDUs can be selected to provide the next block of data to be transmitted. As in the previous iteration, the second SDU 804 having higher priority can be selected to provide a data block 814, which as shown in FIG. 8C comprises the remainder of the second SDU 804 along with the coupled AAL-5 control data 808. The data block 814 may be 48-bytes in length, or may be extended with padding bytes to provide a 48-byte block. ATM control data 824 can be coupled to data block 814, and the complete ATM cell 834 can be transmitted over the fixed connection 828.

Figure 8D:
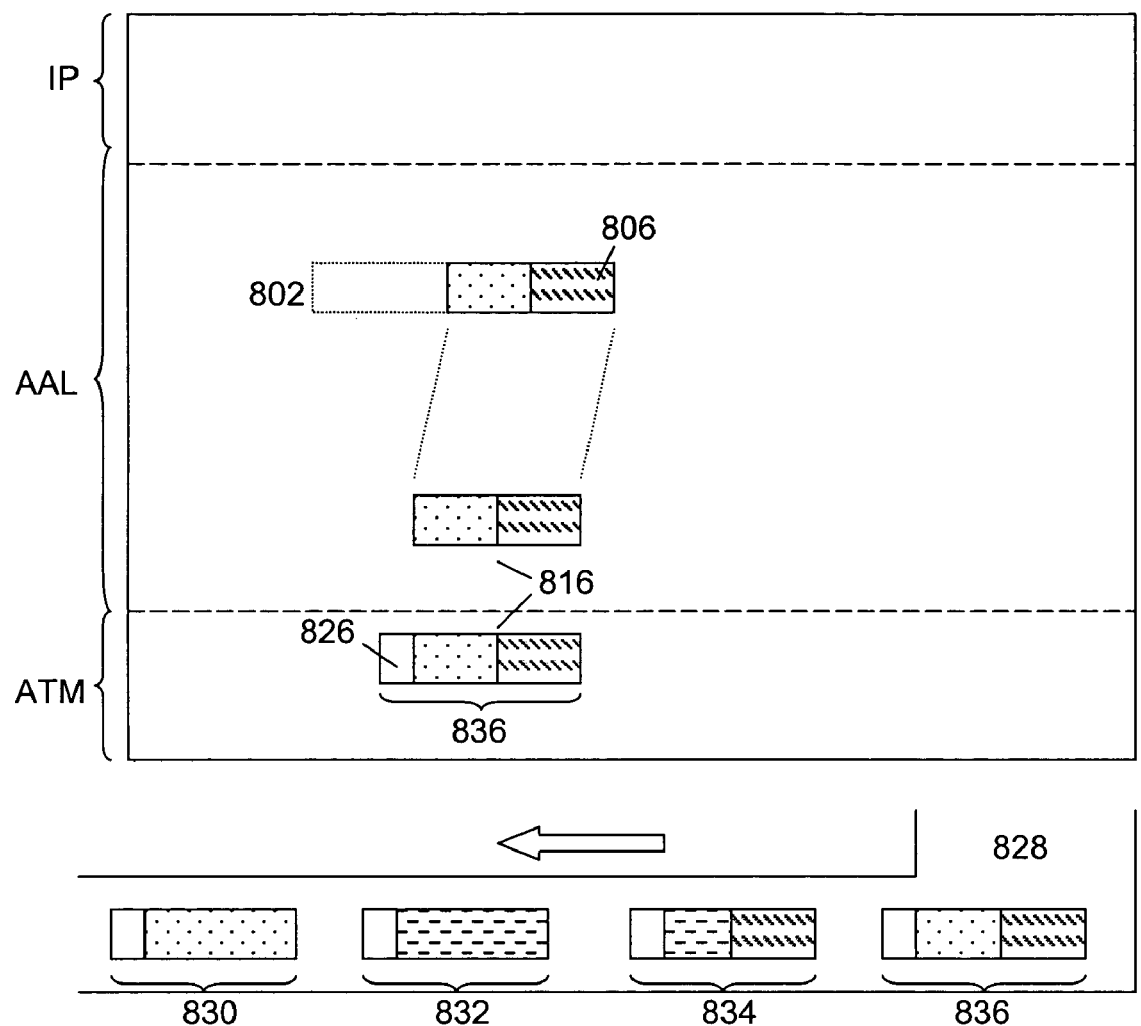

Referring to FIG. 8D, the remainder of the first SDU 802 can now be transmitted. The first request can be selected to provide a block of data 816, which as shown in FIG. 8D comprises the remainder of the SDU 802 and the coupled AAL-5 control data 806. The data block 816 may be 48-bytes in length, or may be extended with padding bytes to provide a 48-byte block. ATM control data 826 can be coupled to the data block 816, and the complete ATM cell 836 can be transmitted over the fixed connection 828.

Figure 9:
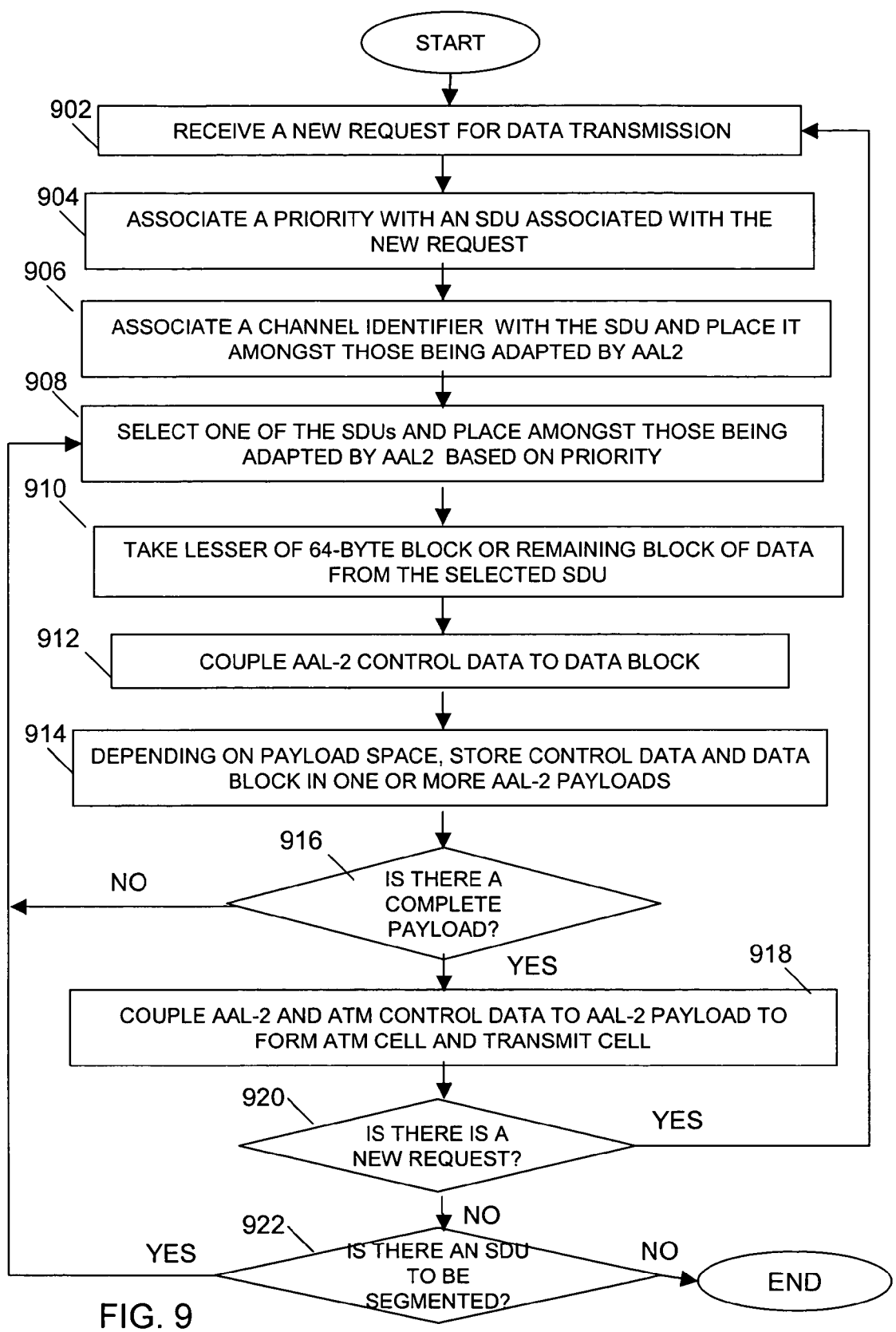
FIG. 9 illustrates an exemplary method of receiving and servicing requests for data transmission adapted to ATM AAL-2; and, FIGS. 10A-10D are diagrams of preparing data to be transmitted over an ATM network using a method according to FIG. 9.

FIG. 9 shows a flow diagram of one embodiment of receiving and servicing requests for data transmission adapted to operate with ATM AAL-2. A request for data transmission can be received (902) at an AAL-2 and can include one or more quality of service requirements and/or higher layer parameters, and can be associated with one or more SDU(s). As provided herein, a priority can be associated (904) with the request and the SDU based on the quality of service requirements and/or the higher-layer parameters, and a channel identifier can be associated (906) with the request and the SDU based on priority.

From the one or more SDUs waiting to be transmitted, one SDU can be selected (908) based on priority. In one embodiment, a block of data can be taken from the selected SDU (910), where the block can be 45-bytes in length or 64-bytes in length, depending on the particular AAL-2 embodiment. For illustration, a 64-byte block will be assumed, although a 45-byte block is permissible. The block of data can also be less than 64-bytes if the remaining portion of the selected SDU is less than 64-bytes. The data block can be coupled to AAL-2 control data (912), which can include the priority and/or the channel identifier associated with the selected request.

In an embodiment, the 64-byte block of data and the coupled control data can be transmitted by more than one ATM cell and may share ATM cell space with data blocks from previous iterations. Depending on the payload space of any empty or partially-filled ATM cells, a data block from a selected SDU can be wholly stored in one ATM cell or stored within multiple ATM cells (914). If there is a complete payload (916), AAL-2 and ATM control data can be coupled to a complete payload to form an ATM cell, and the ATM cell can be transmitted over a connection (918), which can be an ATM virtual circuit, an ATM virtual path, a set of ATM virtual circuits, and/or a set of ATM virtual paths. Otherwise, another SDU waiting to be transmitted can again be selected to provide a block of data (908). If there is a new request (920), a new request for data transmission can be received and serviced (902). Otherwise, if there is no new request and there are SDUs to segment (922), one of the SDUs waiting to be transmitted can again be selected (908), thereby iteratively selecting SDUs for providing data to be transmitted over a channel.

Since an SDU according to the method of FIG. 9 can be transmitted using multiple ATM cells, the length of a data block need not be limited to sixty-four bytes (910). As previously provided, in an embodiment, the length of a data block can be forty-five bytes. In other embodiments, the length of a data block can be stored in AAL-2 control data coupled to the data block (912) and can be limited by the number of bits used to represent the length.

FIGS. 10A-10D show an embodiment of the disclosed systems and methods for receiving and servicing requests for data transmission according to the method of FIG. 9. The IP layer shown in FIG. 10A can provide a first request for data transmission, having an SDU 1002. The AAL-2 can receive the first request for data transmission and associate a priority and channel identifier therewith. The AAL-2 standard natively specifies an 8-bit CID field as part of the AAL-2 control data. In one embodiment, the channel identifier associated with an SDU can be stored in an AAL-2 CID field.

With no other SDUs waiting to be transmitted, the first SDU 1002 can be selected to provide a 64-byte block of data 1022, which can be coupled to AAL-2 control data 1006. In one embodiment, the AAL-2 control data 1006 can correspond to a common part sublayer header having an 8-bit field called the CID field. The 8-bit CID field can store the channel identifier associated with the selected SDU 1002, which can thus have one of two-hundred fifty-six potential channel identifier values. In one embodiment, the channel identifier can be representative of priority in that there can be an implicit association assumed between the allowable channel identifier values and the allowable priority values. Thus, it may not be necessary to store the priority value in the AAL-2 control data where only storing the channel identifier value would also provide an indication of priority.

Figure 10A:
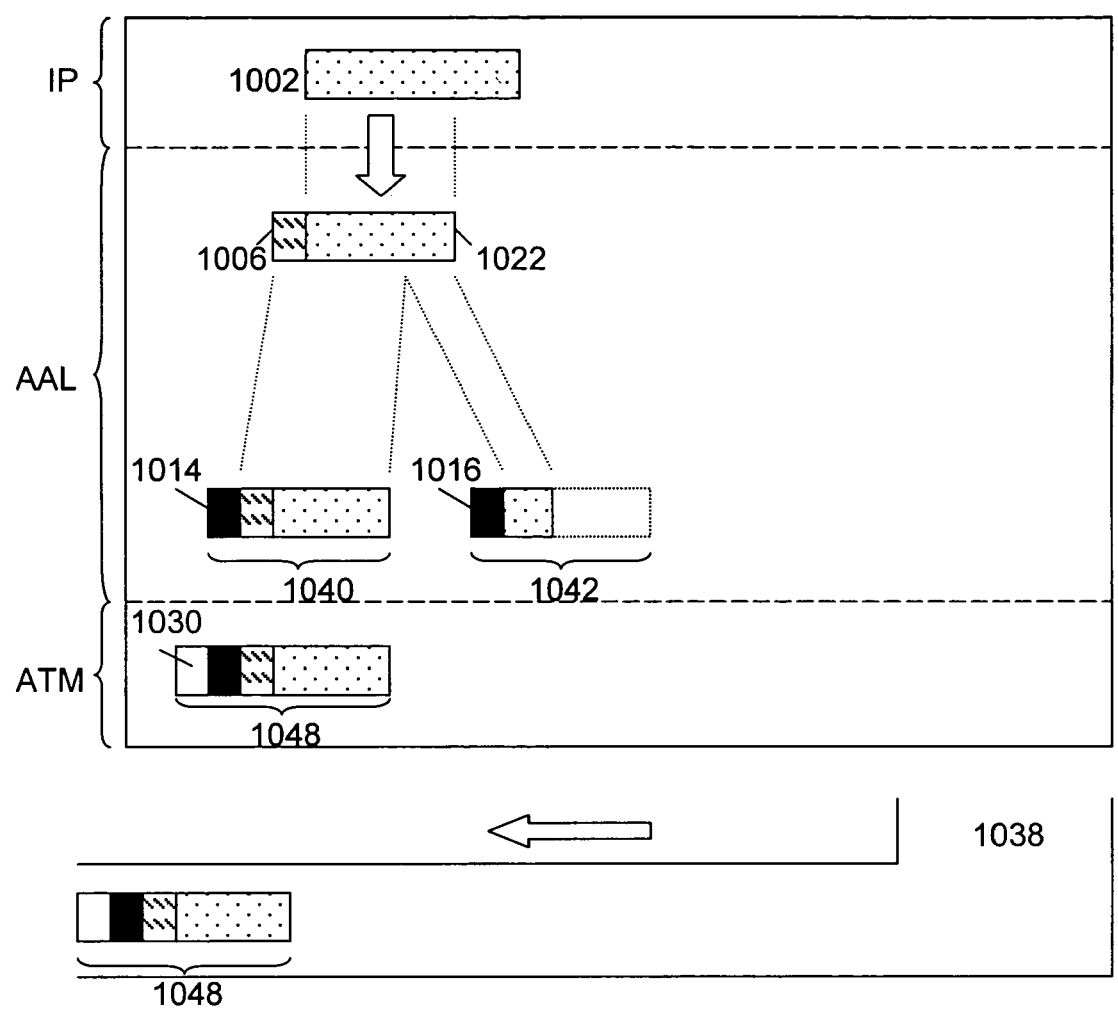

The coupled AAL-2 control data 1006 and the data block 1022 can be stored within multiple ATM cell payloads. As shown in FIG. 10A, AAL-2 control data 1006 and a portion of data block 1022 can be coupled to other AAL-2 control data 1014 to form a complete ATM cell payload 1040, while the remainder of data block 1022 can be stored in a partially-filled ATM cell payload 1042 having control data 1016. The complete ATM payload 1040 can be coupled to ATM control data 1030, and the complete 53-byte ATM cell 1048 can be transmitted over the fixed connection 1038.

Figure 10B:
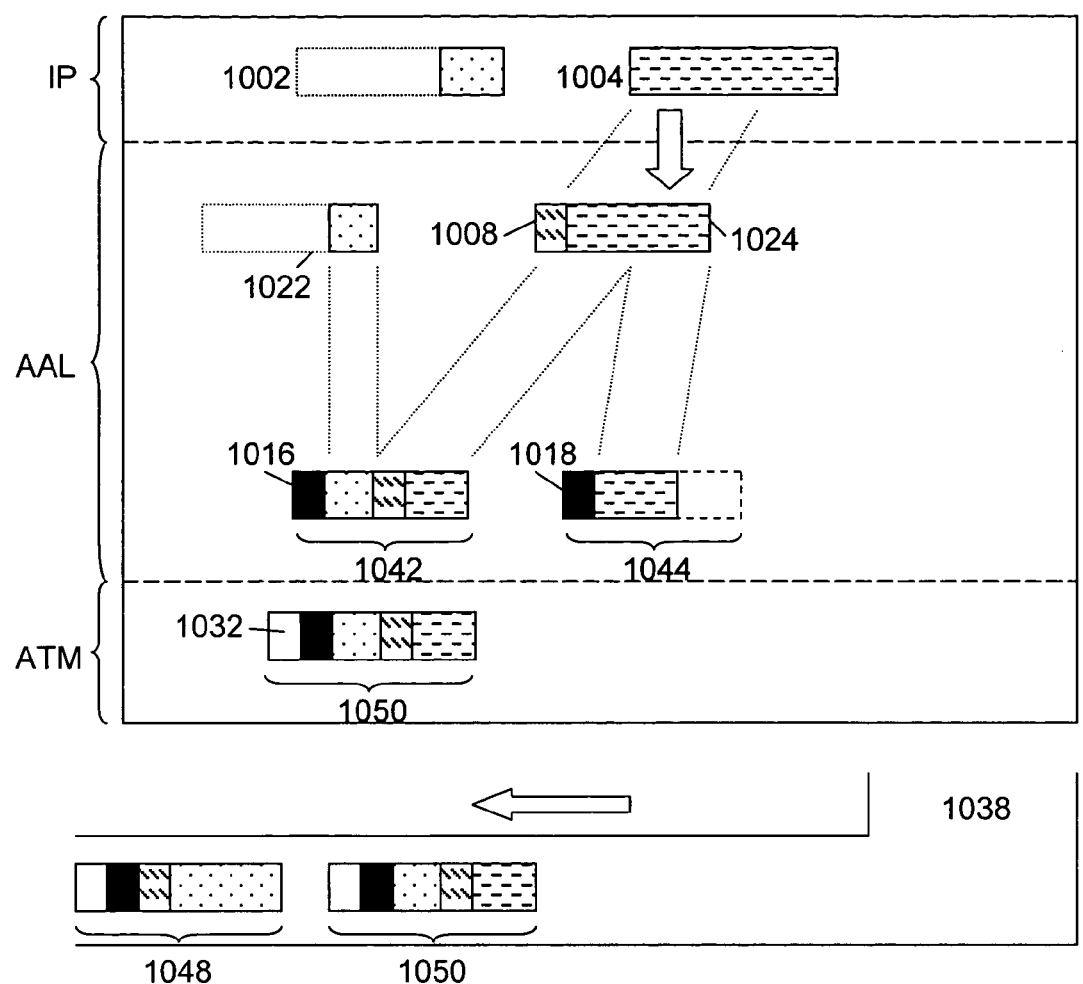

With reference to FIG. 10B, after transmitting the ATM cell 1048, the IP layer can provide a second request for data transmission, having an SDU 1004, and the AAL-2 can associate a priority and a channel identifier with the SDU 1004. In the illustrated scenario of FIG. 10B, the priority associated with the second SDU 1004 can be higher than the priority associated with the first SDU 1002. Accordingly, the second SDU 1004 can be selected to provide a 64-byte block of data 1024, which can be coupled to AAL-2 control data 1008. The AAL-2 control data 1008 can store the channel identifier associated with the selected request.

The coupled AAL-2 control data 1008 and the SDU 1024 can be stored within multiple ATM cell payloads. As shown in FIG. 10B, AAL-2 control data 1008, part of data block 1024, and part of data block 1022 can be coupled to additional AAL-2 control data 1016 to form a complete ATM cell payload 1042, while the remainder of SDU 1024 can form a part of a partially-filled ATM cell payload 1044 having control data 1018. The complete payload 1042 can be coupled to ATM control data 1032, and the complete 53-byte ATM cell 1050 can be transmitted over the fixed connection 1038.

Figure 10C:
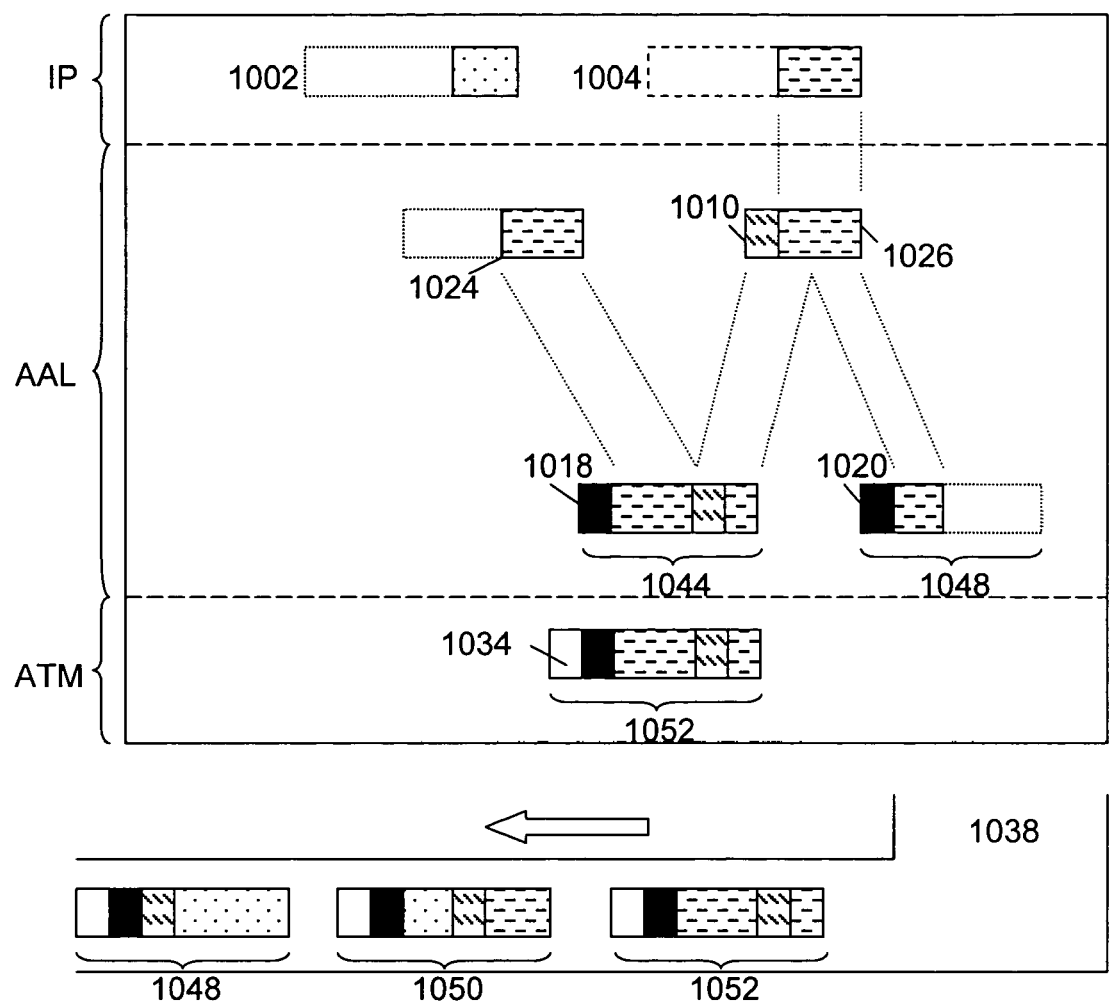

Referring to FIG. 10C, if there is no new request, one of the (first and second) pending SDUs can be selected to provide the next block of data. As in the previous iteration, the second SDU 1004 having higher priority can be selected to provide a data block 1026, which as shown in FIG. 10C comprises the remainder of the second SDU 1004 and may be less than 64-bytes in length. AAL-2 control data 1010 can be coupled to data block 1026 and, as shown in FIG. 10C, can be stored with part of SDU 1024 and part of SDU 1026 to form a complete ATM payload 1044. The remaining portion of SDU 1026 is coupled with control data 1020 and can form a portion of a partially-filled ATM cell payload 1048. The complete ATM payload 1044 can be coupled with other AAL-2 control data 1018 and ATM control data 1034, and the complete 53-byte ATM cell 1052 can be transmitted over the fixed connection 1038.

Figure 10D:
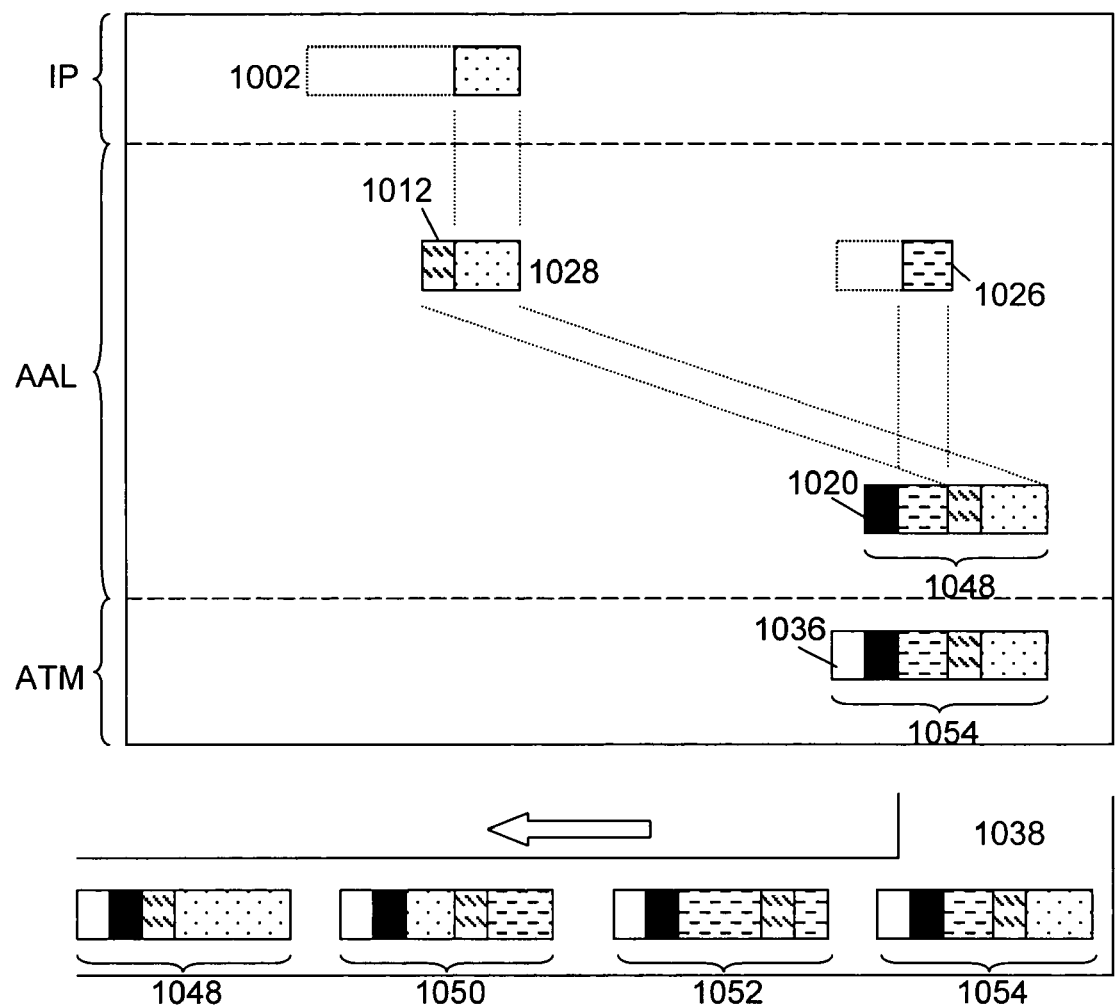

As shown in FIG. 10D, the remainder (e.g., untransmitted portion) of first SDU 1002 can now be transmitted (e.g., provided that no other higher priority requests are received). The first SDU 1002 can be selected to provide a block of data 1028, which may be less than 64-bytes in length. Control data 1012 can be coupled to data block 1028, both of which as shown in FIG. 10D can be stored with part of SDU 1026 to form a complete ATM payload 1048. The complete ATM payload 1048 can be coupled with additional AAL-2 control data 1020 and ATM control data 1036, and the complete 53-byte ATM cell 1054 can be transmitted over the fixed connection 1038.

As discussed herein, FIGS. 8A-8D illustrates one exemplary embodiment of the disclosed systems and methods adapted for AAL-5, while FIGS. 10A-10D illustrate another exemplary embodiment adapted for AAL-2. The ATM cells using AAL-2 and using AAL-5 are different in that the arrangement, type, and/or quantity of control data stored in the cells vary according to the embodiment. Such variations in packet/cell content are not limited to the disclosed illustrations and other arrangements of data and/or types of control data are also within the scope of the disclosed systems and methods.

An integrated services device (e.g. FIG. 3, 304) receiving the transmitted packets can be configured to recognize one or more packet structures. Packet structure can, for example, be specified in control data stored in a packet. An integrated service device receiving the transmitted packets can utilize reassembly techniques to aggregate data blocks. Channel identifiers stored in the control data of the transmitted packets can, for example, be used by such reassembly techniques to distinguish between data associated with different SDUs/requests associated with multiple services sharing the connection.

One application of the disclosed technology includes incorporating the technology into Integrated Services Access Devices (IADs) for accessing broadband services such as DSL and/or broadband fixed and/or mobile wireless data access, where it would be desirable to multiplex data from applications having differing latency requirements for transmission over a single ATM connection. Additionally, a Broadband Remote Access Server (BRAS) can also incorporate the disclosed technology to provide reception/reassembly of priority-based multiplexed channels within a single ATM connection.

The methods and systems described herein are not limited to particular hardware or software configurations and may find applicability in many computing or processing environments. The methods and systems can be implemented in hardware or software, or a combination of hardware and software, where hardware can be understood to include analog and digital chips and circuitry, discrete circuit components arranged a printed circuit board, application specific integrated circuits, and other types of integrated circuits and hardware. The methods and systems can be implemented in one or more computer programs, where a computer program can be understood to include one or more processor executable instructions. The computer program(s) can execute on one or more programmable processors, and can be stored on one or more storage media readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) is preferably implemented using one or more high level procedural or object-oriented programming languages to communicate with a computer system; however, the program(s) can be implemented in assembly or machine language, if desired. The language can be compiled or interpreted.

The processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, or another device capable of being integrated with a processor(s) that can operate as provided herein. Accordingly, the devices provided herein are not exhaustive and are provided for illustration and not limitation.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A method of communicating data using a fixed connection, the method comprising:
    based on at least two service data units (SDUs), associating a respective priority and a channel identifier with each of the at least two SDUs;
    iteratively:
        selecting one of the at least two SDUs based on the respective priorities associated with each of the at least two SDUs to provide a selected SDU, and,
        forming at least one data packet configured to be transmitted over an asynchronous transfer mode (ATM) network, the at least one data packet including:
            data associated with the selected SDU,
            the channel identifier associated with the selected SDU, and,
            control data associated with the selected SDU, and the control data including a user-to-user field for storing a value representative of the priority associated with the selected SDU in a trailer; and,
    transmitting the formed at least one data packet using the fixed connection.

2. A method according to claim 1, where the fixed connection corresponds to at least one of: an ATM virtual circuit, an ATM virtual path, a set of ATM virtual circuits, a set of ATM virtual paths, and a data-link layer virtual circuit.

3. A method according to claim 1, where the at least two SDUs are associated with at least one process operating according to a network layer protocol.

4. A method according to claim 3, where the at least one process corresponds to at least one of: software instructions and electronic hardware.

5. A method according to claim 3, where the network layer protocol corresponds to Internet Protocol.

6. A method according to claim 1, where the priority associated with each of the at least two SDUs is selected from a predetermined set of allowable priority values based on at least one of: a quality of service requirement associated with the at least two SDUs, and a network layer parameter associated with the at least two SDUs.

7. A method according to claim 1, where the channel identifier associated with the at least two SDUs is selected from a predetermined set of allowable channel identifier values based on the priority associated with each of the at least two SDUs.

8. A method according to claim 1, where selecting one of the at least two SDUs corresponds to using a selection procedure provided in at least one of:
    an ATM adaptation layer, and
    an ATM service specific convergence sublayer.

9. A method according to claim 1, where the priority associated with the selected SDU is greater than or equal to priorities associated with each of the other non-selected SDUs of the at least two SDUs.

10. A method according to claim 1, where one of the at least two SDUs is selected further based on times at which the at least two SDUs are received.

11. A method according to claim 1, further comprising:
forming the at least one data packet based on one or more of the at least two SDUs.

12. A method according to claim 1, where the at least one data packet corresponds to ATM cells.

13. A method according to claim 12, where the at least one ATM cell is transmitted when the cell contains a complete payload and an ATM cell header containing a generic flow control field.

14. A method according to claim 1, where one of the at least one data packet further includes:
header control data associated with the selected SDU, the header control data including an ATM generic flow control field, said header control data storing a value representative of the channel identifier associated with the selected SDU.

15. A method according to claim 14, where the header control data of one of said data packets is communicated in an ATM cell header.

16. A method according to claim 1, where the iterative selection and forming continues until the at least two SDUs are transmitted over the fixed connection.

* * * * *